United States Patent Office 3,051,949
Patented Aug. 28, 1962

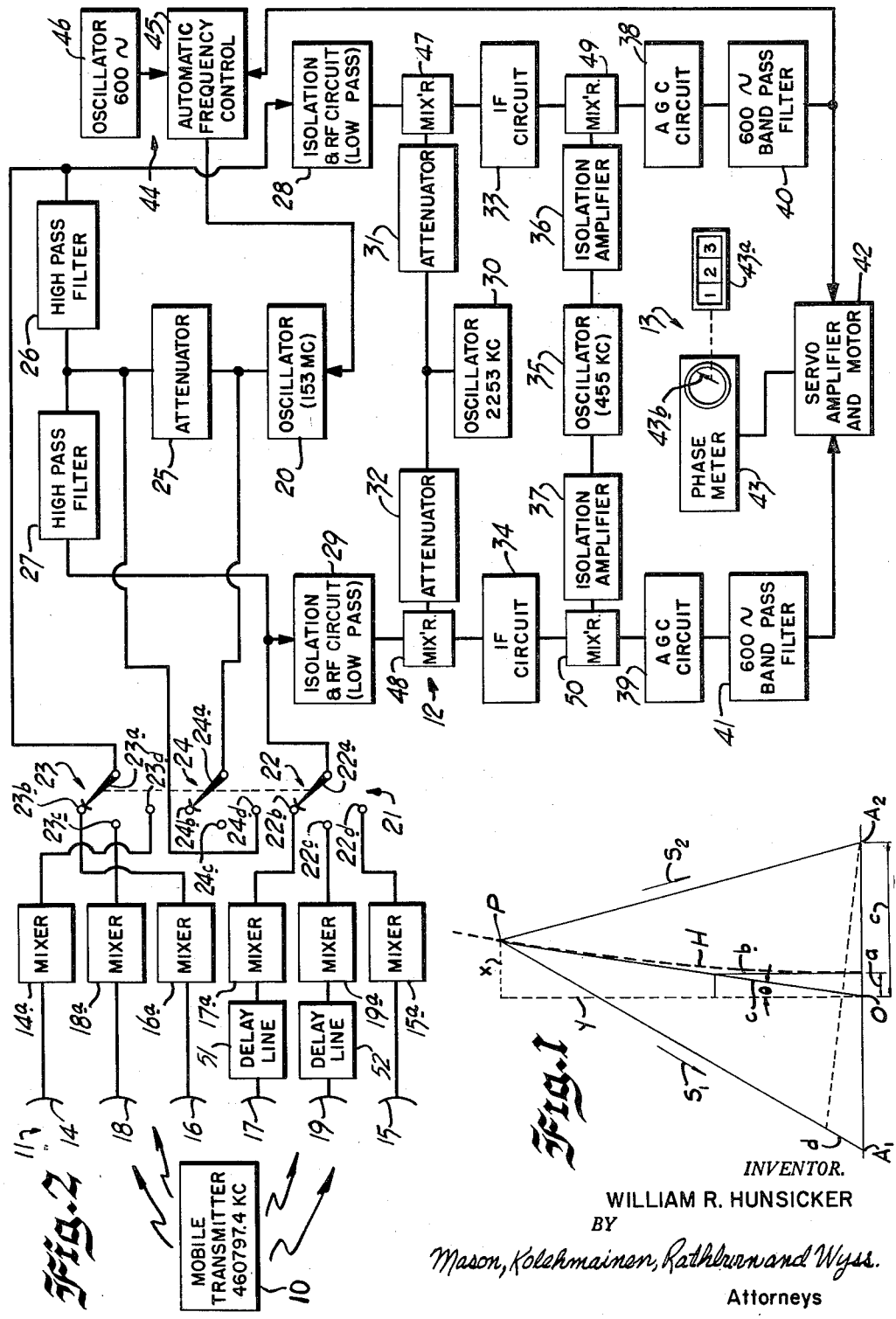

3,051,949
AZIMUTH DETERMINING SYSTEM
William R. Hunsicker, Tulsa, Okla., assignor to Seismograph Service Corporation, Tulsa, Okla., a corporation of Delaware
Filed July 13, 1960, Ser. No. 42,592
20 Claims. (Cl. 343—105)

The present invention relates generally to apparatus for determining the azimuth or bearing of a mobile craft with respect to a known location and is particularly concerned with radio equipment for accurately determining this azimuth by measuring the phase relationship between signals from the mobile craft arriving at several pairs of fixed, spaced apart antennas.

Systems have been proposed prior to the present invention (see, for example, United States Patents Nos. 1,406,996 and 1,510,792) for determining the bearing of a mobile craft by radiating signals from the latter to a pair of fixed receiving points and by measuring the phase relationship between the received signals to provide a hyperbolic indication. If the two receiving antennas are spaced less than one-half wave length of the radiated signal the indication provided is unambiguous and identifies a particular hyperbolic line passing through the mobile craft position and having foci at the antennas. However, when the receiving antennas are so closely spaced the indication provided is very inaccurate due to the fact that normal equipment errors present in any phase measurement represent a relatively large error in the azimuth. If the antennas are moved far enough apart to provide the desired system accuracy the indications become ambiguous since the same indications will be obtained for more than one hyperbola. As a result, it becomes impossible to identify with absolute certainty the particular hyperbolic line along which the mobile craft is located.

The principal object of the present invention is to provide a system of the character indicated above which is capable of providing indications substantially free from ambiguity but, at the same time, possessing a very high degree of accuracy.

A further object of the present invention is to provide a system of the character described but employing pairs of differently spaced receiving antennas with the signals arriving at the most widely spaced pair of antennas being used to provide a very accurate determination of the azimuth along which the mobile craft is located and with the signals arriving at the more closely spaced antennas being used to provide coarse indications for resolving the ambiguity in the accurate indications.

Another object of the present invention is to provide new and improved receiving equipment for use in systems of the type described to develop azimuth indications of increased accuracy.

The invention has for a further object the provision of new and improved receiving equipment for use in systems of the character set forth above and including an oscillator for developing a signal to mix with the signals arriving at the different antennas with the oscillator frequency being controlled to maintain a desired difference frequency between the signals mixed.

The foregoing and other objects are realized, in accordance with the present invention, by providing a system for determining the azimuth or bearing of a mobile craft relative to a known receiving location. The mobile craft is equipped to radiate continuously an omnidirectional, stable, high frequency signal which is received by three pairs of differently spaced antennas at the receiving location. The arriving signals are mixed with the output of a controlled local oscillator to develop from each received signal an R.F. difference signal. The receiving equipment comprises a single indicator for measuring the phase relationships between the R.F. signals which are supplied to the indicator through a switch. Thus, when the switch is in a first position, the indicator measures the phase relationship between the signals arriving at the most closely spaced pair of antennas in order to provide a coarse azimuth indication. When the switch is in another position, the indicator measures the phase relationship between the signals arriving at the most widely spaced antennas, thus providing a fine or accurate azimuth indication. With the switch in a third position, the indicator provides a medium accuracy azimuth indication since it measures the phase relationship between signals arriving at the intermediately spaced antennas. The receiving equipment further includes means for controlling the frequency of the local oscillator to maintain the R.F. difference signals at constant frequency.

The invention, both as to its organization and manner of operation, together with further objects and advantages, will best be understood by reference to the following description taken in conjunction with the accompanying drawing wherein:

FIG. 1 is a diagram which is useful in explaining the operation of the system of the present invention; and FIG. 2 is a diagrammatic view illustrating a system characterized by the features of the present invention.

Referring now to the drawing and first to FIG. 1 thereof, the position of the mobile craft is represented by the point P. This craft may comprise a missile or other high speed aircraft whose path of movement is to be tracked and, to this end, the craft is equipped with a conventional crystal controlled transmitter 10 (FIG. 2) for continuously emitting an omni-directional signal, preferably one of ultra-high frequency such as 460797.4 kilocycles. A pair of typical receiving antennas are shown in FIG. 1 at fixed positions $A_1$ and $A_2$ although in order to facilitate the explanation, the spacing $2c$ between these antennas has been greatly exaggerated with respect to the distance of the mobile craft from the receiving location. The signal $S_1$ arriving at the antenna $A_1$ from the mobile craft travels a greater distance than the signal arriving at the antenna $A_2$. The signals arriving at the two antennas are thus displaced in phase by an amount $\phi$ directly proportional to the difference $(d)$ in distance traveled. This phase displacement, $\phi$, in terms of wavelength is equal to $d/\lambda$ where $\lambda$ is the wavelength of the radiated signal.

As will be well understood by those skilled in this art, if a path is traversed by the mobile craft such that $d$ remains constant, that path is a hyperbola having foci at the points $A_1$ and $A_2$ as indicated by the hyperbolic line H in FIG. 1. By definition, the difference in distance $d$ is equal to the length of the traverse axis $2a$ of the hyperbola and, hence, $$\phi = \frac{2a}{\lambda} \tag{1}$$

The general equation for a hyperbola is:

$$\frac{x^2}{a^2} - \frac{y^2}{b^2} = 1 \tag{2}$$

where $x$ and $y$ are the coordinates of any point on the hyperbola with reference to the center of the hyperbola indicated at O in FIG. 1, "$a$" is the length of the semi-transverse axis and "$b$" is the length of the semi-conjugate axis as shown. The bearing or azimuth of the point P with respect to the center O is represented in FIG. 1 by the angle $\theta$ which is of such value that:

$$\tan \theta = \frac{x}{y} \quad (3)$$

The equation of the asymptote of the hyperbola is $$x = \frac{ay}{b} \quad (4)$$

At all points where the hyperbola and its asymptote coincide or are essentially the same, that is, when the distance from the transmitter to the receiving antennas is large, then:

$$\tan \theta = \frac{x}{y} = \frac{\frac{ay}{b}}{y} = \frac{a}{b} \quad (5)$$

A phase comparison between the signals arriving at the antennas $A_1$ and $A_2$ indicates the magnitude of $\phi$ in electrical degrees and, hence, permits a solution of Equation 1 above for "$a$." This value may be used in solving Equation 5 for $\theta$ in order to determine the bearing of point P from the center O for all cases where the mobile craft is relatively far from the receiving location. The magnitude of "$\theta$" in electrical degrees may, of course, be converted into linear units, if desired, but in any event, the phase comparison identifies the particular hyperbola on which the point P is located.

A system for making the phase comparisons referred to above is illustrated in FIG. 2 and includes the features of the present invention. This system comprises a receiving antenna array indicated generally at 11 for receiving the signals from the mobile craft 10, a receiver 12 for converting the received signals to low frequency signals suitable for phase comparison and an indicator or phase measuring means 13 for measuring the phase relationship between the low frequency signals to provide the desired azimuth information. The antenna array 11 consists of three pairs of conventional reflectors and associated vertical dipole antennas. The most widely spaced pair of antennas 14 and 15 supply signals to the receiver and indicator to provide a fine or accurate azimuth indication as will be described hereinafter. The most closely spaced pair of antennas 16 and 17 supply signals which are used to provide a coarse azimuth indication and the remaining pair of antennas 18 and 19, which have a spacing therebetween intermediate that of the other two pairs, supply signals for developing a medium accuracy azimuth indication. A mixer circuit is located adjacent each antenna for mixing the arriving signal with a local oscillator signal developed by an oscillator 20 in the receiver 12. The mixer associated with the antenna 14 is identified by the reference numeral 14a, while that associated with the antenna 15 is identified as 15a and so on.

The receiver 12 is located approximately at the midpoint of the antenna array 11 and is connected to the mixer circuits through conventional coaxial cables and through a three section, three position switch 21 which serves to select the particular pair of antennas to be connected to the receiver. Thus, when the switch is in its first position illustrated in FIG. 2, that is, with the movable poles 22a, 23a and 24a of its three sections in respective engagement with fixed contacts 22b, 23b and 24b, the switch sections 22 and 23 connect the mixers 16a and 17a to the receiver in order to supply signals developed by the oscillator 20. Preferably the latter oscillator develops an output having a fundamental frequency of 153 megacycles which, with the switch section 24 in its first position, is applied through an attenuator 25 to a pair of high pass filters 26 and 27. The latter filters pass the fundamental frequency of the oscillator signal to the mixers where a third harmonic of the 153 megacycle fundamental is generated to mix or heterodyne with the signals arriving from the transmitter 10 in order to develop a 1797.4 kilocycle R.F. difference signal at the output of each mixer. These R.F. difference signals are supplied to the receiver via the same coaxial cables as their respective 153 megacycle signals traveled out on and are then passed through suitable isolation amplifiers 28 and 29 to mix in mixers 47 and 48 with the output of an R.F. oscillator 30 in the receiver. The isolation amplifiers 28 and 29 amplify the R.F. signals and, at the same time, prevent the very high frequency signals from the oscillator 20 and the antennas from entering the high frequency R.F. circuits. The oscillator 30 develops an output signal having a frequency suitable for converting the R.F. difference signals to a desired I.F. signal. For example, the oscillator 30 may provide a signal of 2253 kilocycles which is passed through attenuators 31 and 32 and is then mixed with the R.F. signal in conventional mixing, converting circuits 47 and 48 in order to develop 455.6 kilocycles I.F. signals. The latter I.F. signals are passed through amplifying circuits 33 and 34 and are again mixed with the output of an I.F. oscillator 35 to develop the low frequency signals for phase comparison. To this end, the oscillator 35 develops a signal of suitable frequency, for example, 455 kilocycles, to convert the I.F. signals to the desired low frequency. Specifically, the output of the oscillator 35 is applied through isolation amplifiers 36 and 37 of conventional construction to a pair of mixer circuits 49 and 50 where they are mixed with the outputs from circuits 33 and 34, respectively, thus developing a pair of low frequency signals which in the example being described have a frequency of 600 cycles. These low frequency signals are passed through automatic gain control circuits 38 and 39 to eliminate amplitude variations and are then passed through noise removing 600 cycle bandpass filters 40 and 41 to the indicator or phase measuring means 13. This indicator is of the type described and claimed in Hawkins and Koeppel Patent No. 2,551,211 assigned to the same assignee as the present invention and, as a result, reference may be made to this patent for a more detailed description. This indicator includes a servoamplifier and motor circuit 42 for driving a phasemeter 43 in order to measure the phase relationship between the two low frequency signals respectively passed by the filters 40 and 41. With the switch 21 in its first position, this measurement indicates the phase relationship between the two signals respectively arriving at the antennas 16 and 17 since the low frequency signals are developed from the latter signals by lowering the frequency in steps without altering the phase relationship. The phasemeter 43 is preferably provided with a set of integrating counters 43a mechanically driven from its rotatable pointer or indicator 43b for the purpose of counting the number of complete 360° revolutions of the pointer in order to identify the lane within which the mobile craft is located. It will be understood from the foregoing description that the indication provided by the phasemeter 43 with the switch 21 in its first position identifies a hyperbola passing through the location of the mobile craft and having foci at the antennas 16 and 17. Since these foci are located relatively close together, the hyperbolas to which the latter indications pertain diverge very rapidly and the indications provided possess relatively low accuracy. For this reason, these indications are referred to as "coarse" indications.

In accordance with another feature of the present invention, a portion of one of the low frequency signals is passed to a frequency control circuit 44 which controls the output frequency of the oscillator 20 in order to maintain the desired frequency difference between the signals arriving from the transmitter and those applied to the antenna mixers from the oscillator 20. The circuit 44 comprises a slope detector or automatic frequency control circuit 45 which is excited by the output of the bandpass filter 40 and by a standard signal supplied from a highly stable, low frequency source such as a fork controlled oscillator 46. In the event of deviation in frequency between the standard signal and the low frequency signal developed by the receiver 12, the circuit 45 functions in well known manner to provide a unidirectional signal of proper polarity to drive the oscillator 20 in a direction to correct the deviation.

If the switch 21 is placed in its second position with the movable arms or poles 22a, 23a and 24a of the sections 22, 23 and 24 in respective engagement with contacts 22c, 23c and 24c, the mixers 18a and 19a are connected to the receiver 12. With the switch 21 in the second position, the receiver 12 and the indicator 13 function in a manner which will be obvious from the foregoing description to provide an indication identifying a hyperbola having foci at the antennas 18 and 19 and passing through the location of the mobile craft. The latter indications are termed medium or intermediate indications since the hyperbolas to which they pertain are spaced somewhat closer together than those to which the coarse indications pertain and, hence, the medium indications are somewhat more accurate. The total error of the angular position of the pointer on the phasemeter 43 is, of course, determined by the equipment errors. However, the amount of azimuth error represented by this position error is a function of the frequency of the signal radiated from the mobile craft and of the spacing between the antennas. Thus, the spacing between the "coarse" antennas 16 and 17 is selected to provide a "coarse" indication of sufficient accuracy to identify the proper lane count for the "medium" indication.

When the switch 21 is placed in its third position, that is, with the movable arms 22a, 23a and 24a of the three switch sections in respective contact with the fixed contacts 22d, 23d and 24d, the pair of antennas 14 and 15 are connected to the receiver 12 through the switch sections 22 and 23. The switch section 24 is effective to bypass the attenuator 25 in order to provide compensation for the cable length connecting the receiver to the remote antennas. Specifically, since the receiver is located relatively close to the antennas 16, 17, 18 and 19 the cable losses when the switch 21 is in its first and second positions will be somewhat less than those encountered when the switch 21 is in its third position to connect the receiver to the somewhat more distant antennas 14 and 15. The inclusion of the attenuator 25 in the circuit when the switch is in the first and second positions makes up for the difference in losses and, hence, assures that all of the antenna mixers receive approximately equal amplitude signals from the oscillator 20. The receiver 12 and the indicator 13 function in the manner described above to measure the phase relationship between the signals arriving at the antennas 14 and 15, thus providing a fine or highly accurate azimuth indication. The spacing between the antennas 14 and 15 is selected to provide the desired system accuracy at the frequency selected and the spacing between the antennas 18 and 19 is then selected so that the accuracy of the medium indication is sufficient to identify the proper lane count on the counters 43a for the fine indication.

A delay line is interposed between one of the antennas of the coarse pair 16 and 17 and its associated mixer and a similar delay line is inserted between one of the antennas of the medium pair 18 and 19 and its mixer in order to compensate for differences in travel times of the signals over the coaxial cable leading to the receiver. Since the lengths of coaxial cables are difficult to reproduce exactly in practice, they are made reasonably equal in length and a residual travel time difference can be expected. The delay line 51 compensates for this difference in travel time so that the input signals to the receiver differ in phase only by the difference in the transit times of the signal from the mobile craft to the two antennas connected to the receiver. Similarly, the delay line 52 is selected to introduce a delay sufficient to compensate for the residual difference time between antennas 18 and 19 and the receiver 12.

While, as was indicated above, the spacings between the antenna pairs may be selected to meet the desired system accuracy, one system operating in the 461 megacycle range which has been found to provide satisfactory results employs fine antennas 14 and 15 spaced about 1222 feet apart, medium antennas 18 and 19 spaced 200 feet apart and coarse antennas spaced 6 feet apart. The fine antenna system produces an azimuth indication accurate to within one second of arc, the medium antenna system provides an indication accurate to within 6.1 seconds of arc and the coarse antenna system provides a coarse indication accurate to within 3 minutes 28.3 seconds of arc.

Since all of the computations for azimuth are made under the assumption that the asymptote coincides with the hyperbolic line, that is, under the assumption that the mobile craft is relatively far from the receiving location, these computations possess increasing inaccuracies as the mobile craft approaches the receiver. For all distances in excess of 15 miles these inaccuracies are negligible but for lesser distances a correction must be introduced in order to maintain the system accuracy to within one second of arc. This correction may be obtained from a curve which plots system error as a function of distance and the proper correction factor may be applied to the indication provided at the particular distance involved.

In the operation of the system described, the coarse antenna system is first calibrated by placing the switch 21 in its first position and maintaining continuous lane count. However, a coarse position indication may also be obtained in any manner well known in the art as, for example, by use of a single, direction finding loop antenna. Since there are only 2.84 coarse lanes in the particular system described above, it is usually possible to identify the coarse lane through use of equipment of the latter type. With the coarse lane count established a phasemeter reading is then made with the switch 21 in its first position. A phasemeter reading of the medium system is then computed which would correspond to the coarse system reading. This computed reading yields the proper lane count for the medium system and, hence, the switch 21 is next thrown to the second position and the phasemeter 43 is again read. The latter reading plus the computed lane count is the total reading. A reading for the fine system is then computed to correspond to the total reading in order to obtain the proper lane count for the fine system. The counters 43a are then set to indicate the latter lane count and the switch 21 is thrown to the third position so that the phasemeter 43 accurately identifies the azimuth to the mobile craft within the identified lane. Thereafter, as long as the system remains in continuous operation, the counters keep track of the lanes traversed by the mobile craft. Thus, these counters avoid the requirement for switching to the medium and coarse antennas each time that a lane count is desired. It should be understood, however, that the coarse indication completely identifies the medium lane while the medium indication identifies the fine lane count. Thus, the three indications, taken together, provide an absolute azimuth determination even in the absence of the integrating counters. The latter counters merely permit the switch 22 to remain in its fine position during normal operation without losing the lane count. If a check is desired on the counters at any time, the calibrating procedure described above is followed.

While a particular embodiment of the invention has been illustrated and described, it will be understood by those skilled in this art that many modifications and changes may be made without departing from the true spirit and scope of the invention as set forth in the appended claims.

What is claimed as new and desired to be secured by Letters Patent of the United States is:

1. In a system for determining the azimuth of a mobile craft relative to a receiving location, the combination of means on said mobile craft for continuously radiating a signal, first, second and third pairs of antennas at said receiving location for receiving said signal with the antennas of the first pair being farther apart than the antennas of the second pair and the antennas of the second pair being spaced farther apart than the antennas of the third pair, the six antennas being colinear and being so arranged that the two antennas of the second pair are respectively disposed approximately equidistant from and on opposite sides of the perpendicular bisector of a line joining the antennas of the third pair, the two antennas of the first pair being respectively disposed substantially equidistant from and on opposite sides of said perpendicular bisector, the distance between each antenna of the first pair and said perpendicular bisector being substantially greater than that between said perpendicular bisector and each antenna of the second pair, means for measuring the phase relationship between the signals received by the first pair of antennas in order to provide a first indication accurately representing a hyperbolic azimuth of said craft, said hyperbolic azimuth having foci respectively located at the antennas of the first pair, means for measuring the phase relationship between the signals received by the second pair of antennas in order to provide a second indication representing said azimuth of the craft but with less accuracy than the first indication so that said second indication may be used to resolve ambiguity of the first indication, and means for measuring the phase relationship between the signals received by the third pair of antennas in order to provide a third indication representing said azimuth of the craft but with less accuracy than the second indication, thereby to provide a coarse indication for resolving ambiguity of second indication.

2. In a system for determining the azimuth of a mobile craft relative to a receiving location, the combination of means on said mobile craft for radiating a signal, first, second and third pairs of antennas at said receiving location for receiving said signal with the antennas of the first pair being farther apart than the antennas of the second pair and the antennas of the second pair being spaced farther apart than the antennas of the third pair, the six antennas being colinear and being so arranged that the two antennas of the second pair are respectively disposed approximately equidistant from and on opposite sides of the perpendicular bisector of a line joining the antennas of the third pair, the two antennas of the first pair being respectively disposed substantially equidistant from and on opposite sides of said perpendicular bisector, the distance between each antenna of the first pair and said perpendicular bisector being substantially greater than that between said perpendicular bisector and each antenna of the second pair, means responsive to the signals received by the first pair of antennas for providing a first indication accurately representing a hyperbolic azimuth of said craft, said hyperbolic azimuth having foci respectively located at the antennas of the first pair, means responsive to the signals received by the second pair of antennas for providing a second indication representing said azimuth of the craft but with less accuracy than the first indication so that said second indication may be used to resolve ambiguity of the first indication, and means responsive to the signals received by the third pair of antennas for providing a third indication representing said azimuth of the craft but with less accuracy than the second indication, thereby to provide a coarse indication for resolving ambiguity of the second indication.

3. In a system for determining the azimuth of a mobile craft relative to a receiving location, the combination of means on said mobile craft for radiating a signal, first, second and third pairs of antennas at said receiving location for receiving said signal with the antennas of the first pair being farther apart than those of the second pair and with the antennas of the second pair being farther apart than those of the third pair, the six antennas being colinear and being so arranged that the two antennas of the second pair are respectively disposed approximately equidistant from and on opposite sides of the perpendicular bisector of a line joining the antennas of the third pair, the two antennas of the first pair being respectively disposed substantially equidistant from and on opposite sides of said perpendicular bisector, the distance between each antenna of the first pair and said perpendicular bisector being substantially greater than that between said perpendicular bisector and each antenna of the second pair, a single receiving and indicating means, and switch means effective in a first condition to connect the first pair of antennas to said receiving and indicating means to provide a fine indication representing a hyperbolic azimuth of said craft, said hyperbolic azimuth having foci respectively located at the antennas of the first pair, effective in a second condition to connect the second pair of antennas to the receiving and indicating means to provide a medium indication representing said azimuth of the craft but with less accuracy than the fine indication so that said medium indication may be used to resolve ambiguity of the fine indication, and effective in a third condition to connect the third pair of antennas to the receiving and indicating means to provide a coarse indication representing said azimuth of the craft but with less accuracy than the medium indication so that the coarse indication may be used to resolve the ambiguity of the medium indication.

4. In a system for determining the azimuth of a mobile craft relative to a receiving location, the combination of means on said mobile craft for radiating a signal, first and second pairs of antennas at said receiving location for receiving said signal with the antennas of the first pair being farther apart than the antennas of the second pair, the antennas of both pairs being colinear and the antennas of said first pair being respectively located equidistant from and spaced on opposite sides of the perpendicular bisector of a line joining the antennas of the second pair, a single receiving and indicating means, and switch means effective in a first condition to connect the first pair of antennas to said receiving and indicating means to provide a first indication representing a hyperbolic azimuth of said craft, said hyperbolic azimuth having foci respectively located at the antennas of the first pair and effective in a second condition to connect the second pair of antennas to the receiving and indicating means to provide a second indication representing said azimuth of the craft but with less accuracy than the first indication so that said second indication may be used to resolve ambiguity of the first indication.

5. In a system for determining the azimuth of a mobile craft relative to a receiving location, the combination of means on said mobile craft for continuously radiating a signal, first and second pairs of antennas at said receiving location for receiving said signal with the antennas of the first pair being farther apart than the antennas of the second pair, the antennas of both pairs being colinear and the antennas of said first pair being respectively located equidistant from and spaced on opposite sides of the perpendicular bisector of a line joining the antennas of the second pair, means for measuring the phase relationship between the signals received by the first pair of antennas in order to provide a first indication representing a hyperbolic azimuth of said craft, said hyperbolic azimuth having foci respectively located at the antennas of the first pair, and means for measuring the phase relationship between the signals received by the second pair of antennas in order to provide a second indication representing said azimuth of the craft but with less accuracy than the first indication so that said second indication may be used to resolve ambiguity of the first indication.

6. In a system for determining the azimuth of a mobile craft relative ot a receiving location, the combination of means on said mobile craft for radiating a signal, first and second pairs of antennas at said receiving location for receiving said signal with the antennas of the first pair being farther apart than the antennas of the second pair, the antennas of both pairs being colinear and the antennas of said first pair being respectively located equidistant from and spaced on opposite sides of the perpendicular bisector of a line joining the antennas of the second pair, means responsive to the signals received by the first pair of antennas for providing a first indication representing a hyperbolic azimuth of said craft, said hyperbolic azimuth having foci respectively located at the antennas of the first pair, and means responsive to the signals received by the second pair of antennas for providing a second indication representing said azimuth of the craft but with less accuracy than the first indication so that said second indication may be used to resolve ambiguity of the first indication.

7. In a system for determining the azimuth of a mobile craft relative to a receiving location, the combination of means on said mobile craft for radiating a signal, first and second pairs of antennas at said receiving location for receiving said signal with the antennas of the first pair being farther apart than the antennas of the second pair, the antennas of both pairs being colinear and the antennas of said first pair being respectively located equidistant from and spaced on opposite sides of the perpendicular bisector of a line joining the antennas of the second pair, means for measuring the phase relationship between the signals received by the first pair of antennas in order to provide a first indication representing a hyperbolic azimuth of said craft, said hyperbolic azimuth having foci respectively located at the antennas of the first pair, and means for measuring the phase relationship between the signals received by the second pair of antennas in order to provide a second indication representing said azimuth of the craft but with less accuracy than the first indication so that said second indication may be used to resolve ambiguity of the first indication.

8. In a system for determining the azimuth of a mobile craft relative to a receiving location, the combination of means on said mobile craft for continuously radiating a signal, first and second pairs of antennas at said receiving location for receiving said signal with the antennas of the first pair being farther apart than the antennas of the second pair, the antennas of both pairs being colinear and the antennas of said first pair being respectively located equidistant from and spaced on opposite sides of the perpendicular bisector of a line joining the antennas of the second pair, means jointly responsive to the signals received by the first pair of antennas for providing a first indication representing a hyperbolic azimuth of said craft, said hyperbolic azimuth having foci respectively located at the antennas of the first pair, and means jointly responsive to the signals received by the second pair of antennas for providing a second indication representing said azimuth of the craft but with less accuracy than the first indication so that said second indication may be used to resolve ambiguity of the first indication.

9. In a system for determining the azimuth of a mobile craft relative to a receiving location, the combination of means on said craft for continuously radiating a signal, an antenna array comprising first, second and third pairs of antennas at said receiving location for receiving said signal with the antennas of the first pair being spaced farther apart than those of the second pair and with the antennas of the second pair being spaced farther apart than those of the third pair, the six antennas being colinear and being so arranged that the two antennas of the second pair are respectively disposed approximately equidistant from and on opposite sides of the perpendicular bisector of a line joining the antennas of the third pair, the two antennas of the first pair being respectively disposed substantially equidistant from and on opposite sides of said perpendicular bisector, the distance between each antenna of the first pair and said perpendicular bisector being substantially greater than that between said perpendicular bisector and each antenna of the second pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to any desired pair of said antennas through said connecting means, said receiver and indicator including means for developing a locally generated signal for application through said connecting means and through said switch means to the mixers of the pair of antennas connected to the receiver and indicator where the locally generated signal mixes with the received signals to develop a pair of lower frequency signals, said receiver and indicator including means for measuring the phase relationship between said lower frequency signals.

10. In a system for determining the azimuth of a mobile craft relative to a receiving location, the combination of means on said craft for continuously radiating a signal, an antenna array comprising first, second and third pairs of antennas at said receiving location for receiving said signal with the antennas of the first pair being spaced farther apart than those of the second pair and with the antennas of the second pair being spaced farther apart than those of the third pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to any desired pair of said antennas through said connecting means, said receiver and indicator including means for developing a locally generated signal for application through said connecting means and through said switch means to the mixers of the pair of antennas connected to the receiver and indicator where the locally generated signal mixes with the received signals to develop a pair of lower frequency signals, said receiver and indicator also including means for measuring the phase relationship between the lower frequency signals and an automatic frequency control circuit responsive to one of said lower frequency signals and to the output of a standard low frequency source for developing a control signal for controlling the frequency of said locally generated signal.

11. In a system for determining the azimuth of a mobile craft relative to a receiving location, the combination of means on said craft for continuously radiating a signal, an antenna array comprising first, second and third pairs of substantially colinear antennas at said receiving location for receiving said signal with the antennas of the first pair being spaced farther apart than those of the second pair and with the antennas of the second pair being spaced farther apart than those of the third pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to any desired pair of said antennas through said connecting means, said receiver and indicator including means for developing a locally generated signal for application through said connecting means and through said switch means to the mixers of the pair of antennas connected to the receiver and indicator where the locally generated signal mixes with the received signals to develop a pair of R.F. signals, attenuating means connected to said switch means and effective to reduce the amplitude of the locally generated signal supplied to the connecting means whenever the switch means is effective to connect the receiver and indicator to the second and third pair of antennas, a first delay line associated with one of the antennas of the second pair and a second delay line associated with one of the antennas of the third pair for introducing time delays to compensate for the difference in travel times of the signals from the antennas to the receiver and indicator, said receiver and indicator including an R.F. oscillator developing a signal for mixing with said R.F. signals to produce a pair of I.F. signals, an I.F. oscillator for developing a signal for mixing with said I.F. signals to develop a pair of low frequency signals, bandpass filters respectively passing said low frequency signals, indicating means for measuring the phase relationship between the low frequency signals passed by the bandpass filters, and an automatic frequency control circuit excited by one of said low frequency signals and by the output of a standard low frequency source for developing a control signal for controlling the frequency of said locally generated signal.

12. In a system for determining the azimuth of a mobile craft relative to a receiving location, the combination of means on said craft for continuously radiating a signal, an antenna array comprising first, second and third pairs of substantially colinear antennas at said receiving location for receiving said signal with the antennas of the first pair being spaced farther apart than those of the second pair and with the antennas of the second pair being spaced farther apart than those of the third pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to any desired pair of said antennas through said connecting means, said receiver and indicator including means for developing a locally generated signal for application through said connecting means and through said switch means to the mixers of the pair of antennas connected to the receiver and indicator where the locally generated signal mixes with the received signals to develop a pair of R.F. signals, said receiver and indicator including an R.F. oscillator developing a signal for mixing with said R.F. signals to produce a pair of I.F. signals, an I.F. oscillator for developing a signal for mixing with said I.F. signals to develop a pair of low frequency signals, indicating means for measuring the phase relationship between the low frequency signals, and an automatic frequency control circuit excited by one of said low frequency signals and by the output of a standard low frequency source for developing a control signal for controlling the frequency of said locally generated signal.

13. In a system for determining the azimuth of a mobile craft relative to a receiving location, the combination of means on said craft for continuously radiating a signal, an antenna array comprising first, second and third pairs of antennas at said receiving location for receiving said signal with the antennas of the first pair being spaced farther apart than those of the second pair and with the antennas of the second pair being spaced farther apart than those of the third pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to any desired pair of said antennas through said connecting means, said receiver and indicator including means for developing a locally generated signal for application through said connecting means and through said switch means to the mixers of the pair of antennas connected to the receiver and indicator where the locally generated signal mixes with the received signals to develop a pair of lower frequency signals, attenuating means connected to said switch means and effective to reduce the amplitude of the locally generated signal supplied to the connecting means whenever the switch means is effective to connect the receiver and indicator to the second and third pairs of antennas, a first delay line associated with one of the antennas of the second pair and a second delay line associated with one of the antennas of the third pair for introducing time delays to compensate for the difference in travel times of the signals from the antennas to the receiver and indicator, said receiver and indicator including means for measuring the phase relationship between the lower frequency signals, and an automatic frequency control circuit responsive to one of said lower frequency signals and to the output of a standard low frequency source for developing a control signal for controlling the frequency of said locally generated signal.

14. In a system for determining the azimuth of a mobile craft relative to a receiving location, the combination of means on said craft for continuously radiating a signal, an antenna array comprising first and second pairs of antennas at said receiving location for receiving said signal with the antennas of the first pair being spaced farther apart than those of the second pair, a receiver and indicator located at approximately the midpoint of said antenna array, a mixer associated with each of said antennas, switch means for selectively connecting the receiver and indicator to any desired pair of said antennas, said receiver and indicator including means for developing a locally generated signal for application through said switch means to the mixers of the pair of antennas connected to the receiver and indicator where the locally generated signal mixes with the received signals to develope a pair of lower frequency signals, said receiver and indicator including means for measuring the phase relationship between the lower frequency signals, and an automatic frequency control circuit responsive to one of said lower frequency signals and to the output of a standard low frequency source for developing a control signal for controlling the frequency of said locally generated signal.

15. In a system for determining the azimuth of a mobile craft relative to a receiving location, the combination of means on said craft for continuously radiating a signal, an antenna array comprising first and second pairs of antennas at said receiving location for receiving said signal with the antennas of the first pair being spaced farther apart than those of the second pair, the antennas of both pairs being colinear and the antennas of said first pair being respectively located equidistant from and spaced on opposite sides of the perpendicular bisector of a line joining the antennas of the second pair, a receiver and indicator located at approximately the midpoint of said antenna array, a mixer located adjacent each of said antennas, connecting means extending between each mixer and the receiver and indicator switch means for selectively connecting the receiver and indicator to any desired pair of said antennas through said connecting means, said receiver and indicator including means for developing a locally generated signal for application through said switch means and said connecting means to the mixers of the pair of antennas connected to the receiver and indicator where the locally generated signal mixes with the received signals to develop a pair of lower frequency signals, said receiver and indicator including means for measuring the phase relationship between the lower frequency signals.

16. In a system for determining the azimuth of a mobile craft relative to a receiving location, the combination of means on said craft for continuously radiating a signal, an antenna array comprising first, second and third pairs of antennas at said receiving location for receiving said signal with the antennas of the first pair being spaced farther apart than those of the second pair and with the antennas of the second pair being spaced farther apart than those of the third pair, the six antennas being colinear and being so arranged that the two antennas of the second pair are respectively disposed approximately equidistant from and on opposite sides of the perpendicular bisector of a line joining the antennas of the third pair, the two antennas of the first pair being respectively disposed substantially equidistant from and on opposite sides of said perpendicular bisector, the distance between each antenna of the first pair and said perpendicular bisector being substantially greater than that between said perpendicular bisector and each antenna of the second pair, a receiver and indicator located at approximately the midpoint of said antenna array, connecting means between each antenna and the receiver and indicator, switch means for selectively connecting the receiver and indicator to any desired pair of said antennas through said connecting means, a first delay line associated with one of the antennas of the second pair and a second delay line associated with one of the antennas of the third pair for introducing time delays to compensate for the difference in travel times of the signals from the antennas to the receiver and indicator, and said receiver and indicator including means for measuring the phase relationship between the signals received by the pair of antennas connected through said switch means to the receiver and indicator.

17. In a system for determining the azimuth of a mobile craft relative to a receiving location, the combination of means on said craft for continuously radiating a signal, an antenna array comprising first and second pairs of antennas at said receiving location for receiving said signal with the antennas of the first pair being spaced farther apart than those of the second pair, the antennas of both pairs being colinear and the antennas of said first pair being respectively located equidistant from and spaced on opposite sides of the perpendicular bisector of a line joining the antennas of the second pair, a receiver and indicator located at approximately the midpoint of said antenna array, connecting means between each antenna and the receiver and indicator, switch means for selectively connecting the receiver and indicator to either pair of said antennas through said connecting means, a delay line associated with one of the antennas of the second pair for introducing a time delay to compensate for the difference in travel time of the signals from the antennas of the different pairs to the receiver and indicator, and said receiver and indicator including means for measuring the phase relationship between the signals received by the pair of antennas connected through said switch means to the receiver and indicator.

18. In a system for determining the azimuth of a mobile craft relative to a receiving location, the combination of means on said craft for continuously radiating a signal, an antenna array comprising first and second pairs of antennas at said receiving location for receiving said signal with the antennas of the first pair being spaced farther apart than those of the second pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to either pair of said antennas through said connecting means, said receiver including means for developing a locally generated signal for application through said connecting means and through said switch means to the mixers of the pair of antennas connected to the receiver and indicator where the locally generated signal mixes with the received signals to develop a pair of lower frequency signals, attenuating means connected to said switch means and effective to reduce the amplitude of the locally generated signal supplied to the connecting means whenever the switch means is effective to connect the receiver and indicator to the second pair of antennas, said receiver and indicator including means for measuring the phase relationship between the lower frequency signals, and an automatic frequency control circuit responsive to one of said lower frequency signals and to the output of a standard low frequency source for developing a control signal for controlling the frequency of said locally generated signal.

19. In a system for determining the azimuth of a mobile craft relative to a receiving location, the combination of means on said craft for continuously radiating a signal, an antenna array comprising first and second pairs of antennas at said receiving location for receiving said signal with the antennas of the first pair being spaced farther apart than those of the second pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to either pair of said antennas through said connecting means, said receiver including means for developing a locally generated signal for application through said connecting means and through said switch means to the mixers of the pair of antennas connected to the receiver and indicator where the locally generated signal mixes with the received signals to develop a pair of lower frequency signals, attenuating means connected to said switch means and effective to reduce the amplitude of the locally generated signal supplied to the connecting means whenever the switch means is effective to connect the receiver and indicator to the second pair of antennas, and said receiver and indicator including means for measuring the phase relationship between the lower frequency signals.

20. In a system for determining the azimuth of a mobile craft relative to a receiving location, the combination of means on said craft for continuously radiating a signal, an antenna array comprising first and second pairs of antennas at said receiving location for receiving said signal with the antennas of the first pair being spaced farther apart than those of the second pair, a receiver and indicator located at approximately the midpoint of said antenna array, a mixer associated with each of said antennas and located in proximity to its associated antenna, connecting means between each mixer and the receiver and indicator, switch means for selectively connecting the receiver and indicator to either pair of said antennas through said connecting means, said receiver including means for developing a locally generated signal for application through said connecting means and through said switch means to the mixers of the pair of antennas connected to the receiver and indicator where the locally generated signal mixes with the received signals to develop a pair of lower frequency signals, attenuating means connected to said switch means and effective to reduce the amplitude of the locally generated signal supplied to the connecting means whenever the switch means is effective to connect the receiver and indicator to the second pair of antennas, a first delay line associated with one of the antennas of the second pair to compensate for the difference in travel times of the signals from the different pairs of antennas to the receiver and indicator, and said receiver and indicator including means for measuring the phase relationship between the lower frequency signals.

References Cited in the file of this patent

UNITED STATES PATENTS

| | | |
|---|---|---|
| 1,406,996 | Morrill | Feb. 21, 1922 |
| 2,608,685 | Hastings | Aug. 26, 1952 |